Sept. 12, 1967 M. R. EMERSON 3,341,819

COMPUTER SYSTEM

Filed Aug. 18, 1964 3 Sheets-Sheet 1

INVENTOR.
MARVIN R. EMERSON

BY Allan Ratner

COMPUTER SYSTEM
Filed Aug. 18, 1964 3 Sheets-Sheet 2
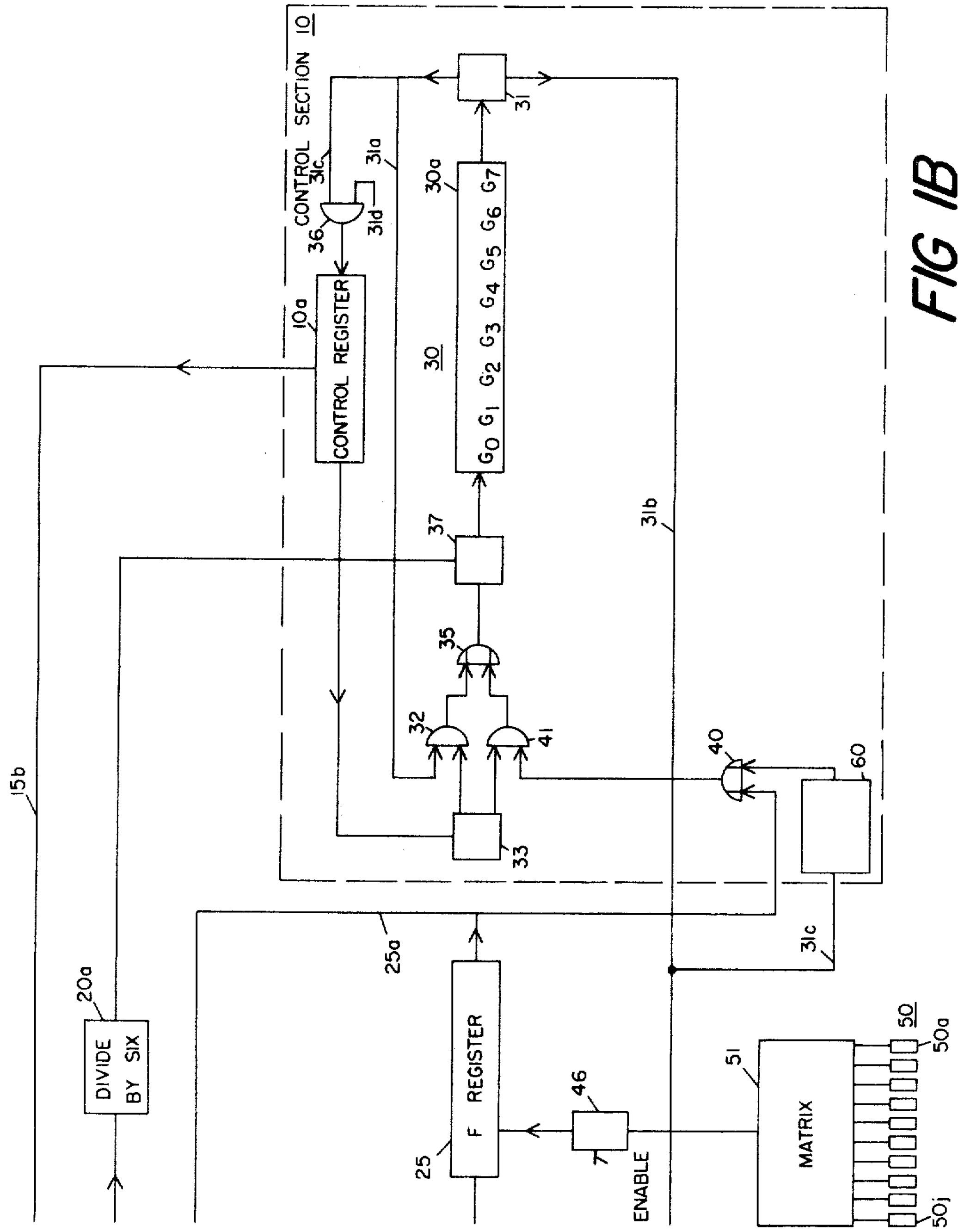
FIG IB
INVENTOR.
MARVIN R. EMERSON
BY Allan Ratner

INVENTOR.
MARVIN R. EMERSON

BY Allan Ratner

United States Patent Office 3,341,819
Patented Sept. 12, 1967

3,341,819

COMPUTER SYSTEM

Marvin R. Emerson, Tustin, Calif., assignor to Pacific Data Systems, Inc., Santa Ana, Calif., a corporation of California Filed Aug. 18, 1964, Ser. No. 390,304
14 Claims. (Cl. 340—172.5)

ABSTRACT OF THE DISCLOSURE

A computer system is adapted for operator selection of a variety of program controlled routines by the provision of a plurality of operator controlled switches or keys each of which is connected to a matrix to generate a selected one of a plurality of predetermined memory address signals in response to the closing of a respective selection switch. The instruction format and computer organization is such that an instruction containing the memory location address of any one of a number of routines may be placed at a memory address accessed by the selection matrix with additional information being contained in the first instruction to allow the computer to return to its previous operating condition upon completion of that routine. Thus, a large number of routines may be stored in the memory with corresponding accessing instructions being preloaded at the respective memory locations that are accessed by the matrix upon the operator's selection of one of the individual selection switches.

Figure 1A:
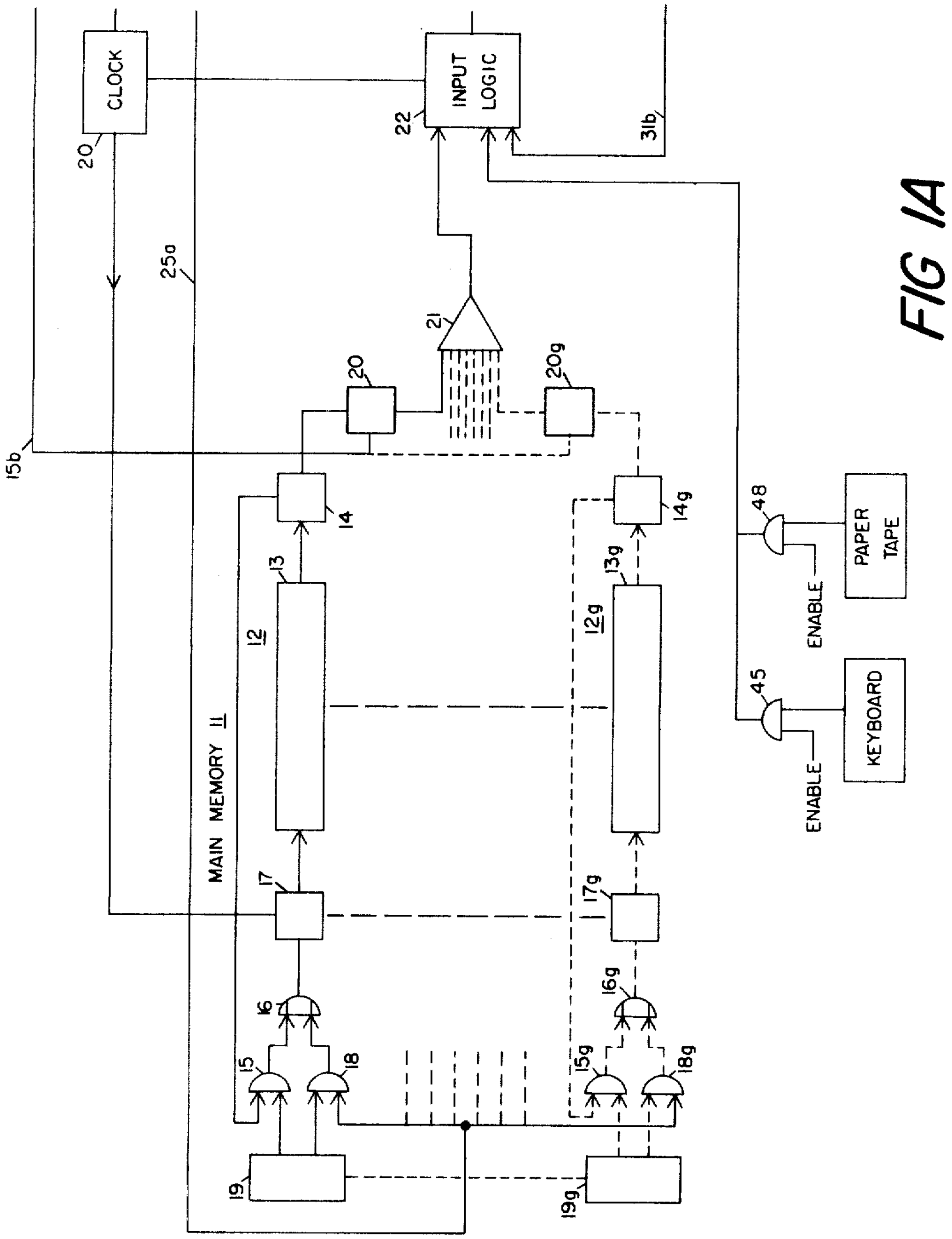

This invention relates to subroutine selection for a computer and more particularly to providing switch selection of a desired subroutine.

Subroutines may be stored in digital computers in a subroutine library that can be accessed by the computer. A particular subroutine may be selected from that library by means of a programmed calling subroutine or by other relatively complex programming means. However, prior computers are lacking in that they do not provide a simple means to enable the operator to conveniently select a desired subroutine from the subroutine library.

Accordingly, an object of the present invention is a system for subroutine selection which may easily and conviently select a desired subroutine.

In accordance with the present invention there is provided a plurality of switches with each switch corresponding to a predetermined first instruction having an address in the computer memory. A second jump instruction has been set at each of the addresses which directs the computer to a desired subroutine entry point. In this manner, by simply actuating a switch, a desired subroutine is selected from the library and is performed by the computer.

In a preferred form of the invention there is provided a digital computer including a memory section and a control section which operates as an instruction register, accumulator, etc. The plurality of switches are connected to a diode matrix and upon actuation of one of the switches a first instruction comprising a jump with link instruction and a first address is injected into the control section. The first instruction commands the computer to access such first address in memory and take the contents and execute it as a second instruction. That second instruction will have been placed in the memory at the address of the first instruction by the programmer and instructs the computer to jump to another address which is the beginning of a program subroutine.

It will be understood that each of the switches has a corresponding first address in memory and a second instruction may be entered at that address to instruct the computer to jump to a selected subroutine entry point. Each time that a particular switch is actuated the computer performs its selected subroutine. It performs this subroutine by obtaining the argument from the accumulator and at the completion of the subroutine the answer is placed back in the accumulator.

The address of the second insruction may be changed by programmer control and therefore the subroutines may be varied. Thus, flexibility is achieved by providing a library of subroutines each of which may be directly selected by an associated switch. It will be understood that the first instruction includes a jump with link so that the subroutine is effectively "nested" within the main program. Thus, after performing the subroutine, the computer jumps back to the next instruction from where it had previously been in the main program.

Figure 2:
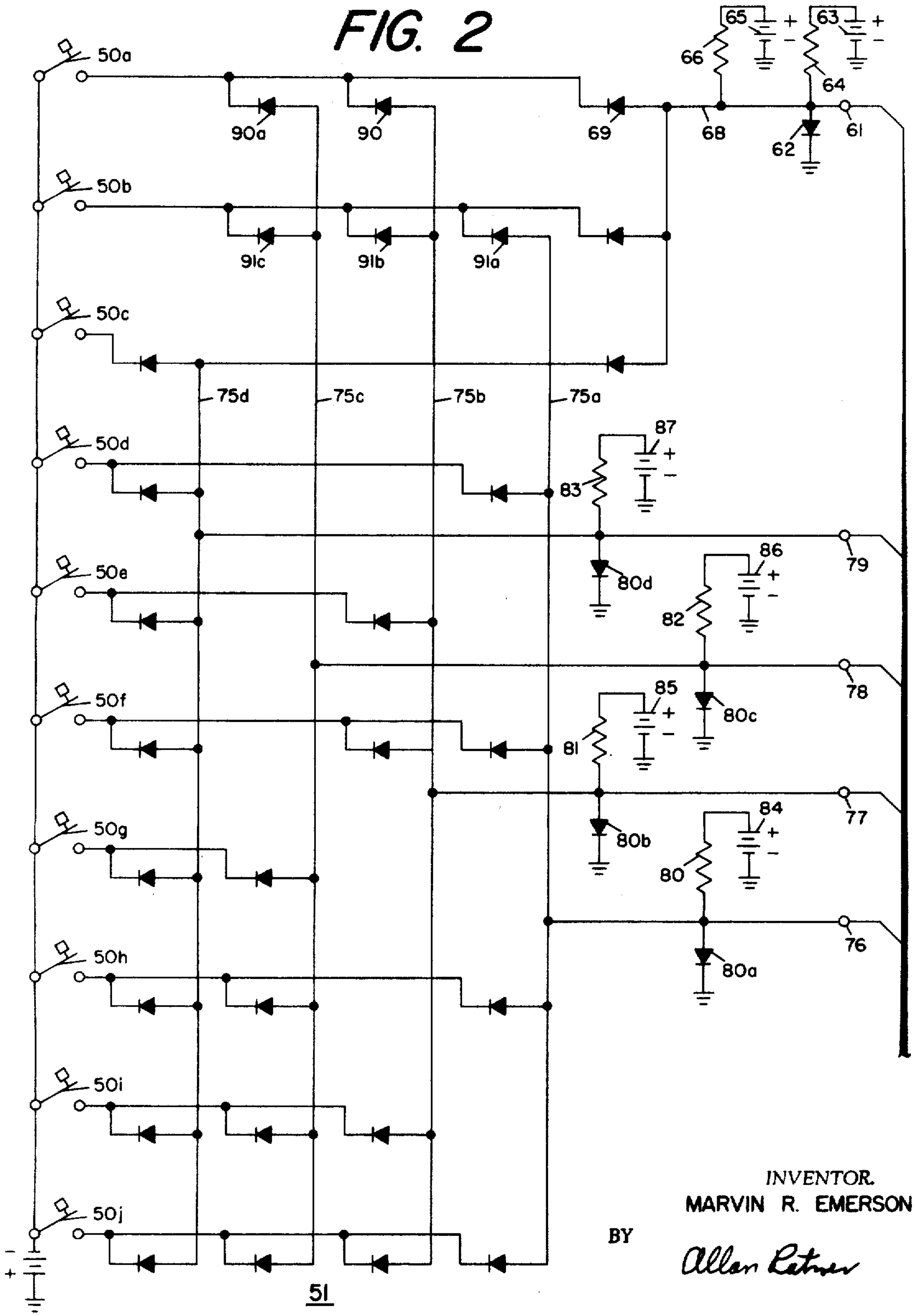

For further objects and advantages of the invention, and for a description of its operation, reference is to be had to the following detailed description taken in conjunction with the accompanying drawings in which:

FIGS. 1A and 1B taken together show in block diagram a digital computer embodying the invention;

FIG. 2 schematically illustrates the switches and matrix utilized for selection of a desired subroutine as shown in block diagram in FIG. 1B.

Referring now to FIGS. 1A and 1B there is shown in block diagram a general purpose serial digital computer having a sequentially controlled stored program. The computer includes a control section 10 and a main memory section 11 and uses seventeen-bit words (four decimal digits) and a parity bit for a total of eighteen bits. Memory 11 is used for internal storage of programs and data and comprises a plurality of recirculating memory circuits 12–12*g*. Recirculating memory circuits using delay lines 13–13*g* are well known in the art and are described for example in "Computer Handbook" edited by Huskey and Korn, McGraw-Hill, 1962, at page 16–12 et. seq. In each of these circuits, information in the form of bits is delayed by the line and then recirculated, and during each recirculation the information may be reshaped and retimed.

More particularly, bits flowing through the delay line 13 of circuit 12, for example, reach the end of the line and are applied by way of a read amplifier 14 to an input of an AND gate 15. The other input of AND gate 15 is enabled by a control circuit 19. Thus bits flow through AND gate 15 and OR gate 16 to an input of a write amplifier 17 and to the delay line 12. In this manner the information in the form of bits is continuously recirculated through the memory circuit 12. The memory circuits 12–12*g* are substantially identical in construction and it therefore has been necessary only to describe one circuit in detail with the corresponding parts in the others being designated by corresponding reference characters with appropriate subscripts.

It will be understood that delay lines 13–13*g* may be any one of the types well known in the art as described for example in "Digital Computer Technology and Design," vol. 2, by Willis H. Wehr, John Wiley, pages 12.1 et seq. Each of the delay lines 13–13*g* is preferably able to store approximately 10,000 bits or 512 words of eighteen bits per word. Write amplifiers 17–17*g* each have a connection to an output of a clock 20 which provides clock timing pulses for the computer. In this manner, clock pulses are applied to each write amplifier and are utilized to provide correct timing of the recirculated bit information. Thus, the timing of the memory circuits 12–12*g* are each synchronized with the clock pulses.

Information may be taken or "accessed" from the memory circuits 12–12*g* by means of gating circuits 20–20*g*. Under control of register 10*a*, circuits 20–20*g* are effective to select one of the memory circuits 12*a*–12*g* and to read out a desired word in that memory circuit. In this way a word from memory is accessed at its particular address and then applied to an input of amplifier 21.

The output of amplifier 21 is applied as one of the inputs to an input logic network 22 which gates the information which is being accessed from memory 11 into an F register 25. The F register 25 may comprise a conventional shift register and is used as a buffer register by retaining information which is then applied to the control section 10. Such shift registers and gating circuits are described for example in "Pulse and Digital Circuits" by Millman and Taub, McGraw-Hill, 1956.

The control section 10 includes a memory circuit 30 having a delay line 30*a* which is able to store approximately 300 bits. In manner similar to that described above with respect to memory 11, circuit 30 operates to recirculate binary information. Bit information flows through the line 30*a* to a read amplifier 31, the upper output of which is applied by way of a lead 31*a* to an input of an AND gate 32. Gate 32 is enabled by a write control circuit 33 operated by control register 10*a*. The output of gate 32 is applied by way of an OR gate 35 to an input of a write amplifier 37. Amplifier 37 has applied thereto clock pulses which have been divided in time by six by network 20*a* and in this way the bit information is amplified and retimed.

Delay line 30*a* is divided into eight discrete "registers," viz. $G_0$–$G_7$. Each of these registers has the following purpose:

$G_0$—Next Instruction Address.
$G_1$—Present Instruction.
$G_2$—Field Length.
$G_3$—Index Register.
$G_4$—Link Return Register.
$G_5$—Signs of Accumulator.
$G_6$—A and B Accumulator.
$G_7$—Accumulator.

As previously described the information that has been accessed from the memory 11 is applied to the F register 25. The output of register 25 is applied by way of an OR gate 40 to an AND gate 41. The write control circuit 33 is effective to enable AND gate 41 rather than AND gate 32 so that for the moment information is no longer recirculated from lead 31*a* into the delay line 30, but is now applied into a particular register $G_0$–$G_7$ from the F register 25. It will be understood that the timing of the insertion of the information from the F register into the desired register $G_0$–$G_7$ of the line 30*a* is controlled by register 10*a* and is in accordance with the previous machine instruction. Thus the information from the F register is timed to be injected into delay line 30 at a desired time so that it is stored in a proper register location. If the information which has been placed in the F register is an instruction word then that instruction will be inserted in register $G_1$ and will next be executed by the computer. Accordingly, that instruction from the register $G_1$ is applied by way of amplifier 31 and lead 31*c* to the input of a gate 36. In executing the instruction, an enable signal is applied to gate input 31*d* enabling gate 36 to feed the instruction into the register 10*a*. In accordance with the instruction, register 10*a* controls the operation of the instruction called for and controls the accessing of the memory 11 by way of lead 15*b* to select line and word addressed circuits 20–20*g*.

On the other hand, if the information in the F register is a data word that data is placed in the accumulator. When a data word is placed in the accumulator, the Next Instruction Address ($G_0$) register is incremented by one. In this manner the foregoing register provides an instruction whose address is accessed in the memory 11 and the information at that address is transferred to the F register. If this information is an instruction that instruction will then be executed by the computer. To summarize, if the word from the F register is not an instruction word containing address information, but a data word or an instruction word of a type not requiring address information, then the computer must be instructed where to obtain its next instruction which has been stored in memory. The computer knows where to go for that instruction in memory by the provision of incrementing the $G_0$ register by one to obtain the address of the next instruction. Sequencing of instruction is described in the literature as for example in the above cited "Computer Handbook" at page 16–28 et seq.

If an instruction is an "accept an instruction from the keyboard" then an enable signal is applied to an input of gate 45 and thus the output of the keyboard is applied by way of that gate to an input of logic network 22. At the same time the enable signal is also applied to a set of gates 46 which allows the output of a matrix 51 to be applied directly to the F register 25. Matrix 51, under actuation of switches 50*a*–50*j*, produces instructions which are applied to the F register and produce the subroutine selection in accordance with the invention. The detailed structure of the matrix will later be described.

In the operation of the subroutine selection switch 50*a* may be pressed and matrix 51 produces in the F register a first instruction as follows: 00011 0000 0000 0110. The first part of each of the instruction word, viz. 00011, corresponds to the instruction or command for the computer to make a jump with a link. That is, the computer is instructed to jump to a first address 0000 0000 0110 and also to store a "return address" in register $G_4$. Thus, after the subroutine has been performed the computer will jump back or return to the next sequential instruction from where it had previously been in the main program.

The first address 0000 0000 0110 corresponds to a particular location in the memory 11 to which the computer is accessed. Memory access is provided, as previously described, by application of the first instruction to the control register 10*a*. Thus, whenever switch 50*a* is actuated that first address is always accessed. The contents of that location in memory 11, at the option of the writer of the computer's program, contains a jump instruction (the second instruction) which causes the computer to jump to another address which is the beginning of a program subroutine. More particularly, after that first address has been accessed to provide the second instruction, that second instruction is transferred by way of network 21 and logic network 22 into the F register 25. The second instruction in register 25 is then effective to jump the computer to its address (second address) which is the entry point in memory 11 of a subroutine. Thus in accordance with the invention upon actuation of switch 50*a* an associated subroutine is selected which is performed by the computer. At the termination of that subroutine the computer is instructed to return to the link address in the Link Return Register $G_4$ so that the main program may continue. Actuation of each of the remaining switches 50–50*j* produces a jump with link instruction, each with a different first address. As for example, actuation of switch 50*b* produces a jump with link instruction 00011 and an address 0000 0000 0111. At that first address will be a second instruction which directs the computer to a desired subroutine.

As will be understood by those skilled in the art, differing second instructions may be placed in memory at the address of a first instruction corresponding to a particular switch 50. In this way each switch may directly select a different subroutine from the library loaded in the memory 11. Subroutines may be loaded into the memory 11 at the initiation of the operation of the computer in the following manner.

In operation, the computer is instructed that data will be loaded from paper tape by applying an enabling signal to AND gate 48. Thus information in the form of instruction words from a paper tape is applied by way of AND gate 48, and logic network 22 into F register 25. The instruction word in F register 25 is then placed in the Accumulator $G_6$ of the line 30*a*. These instructions from paper tape must be placed in the Accumulator since the only way that the memory 11 may be loaded is from the Accumulator. For each word placed in the Accumulator the read amplifier 31 is gated to apply that word by way of a line 31*b* to an input of logic network 22 and back into the F register 25. That instruction word is then applied by way of lead 25*a* to a desired memory circuit 12–12*g*. In this manner each instruction word from paper tape is in turn loaded into the memory 11.

The various arithmetic units are indicated by the block 60 and may be of the types well known in the art. Accordingly, bit information flowing from the write amplifier 31 is conducted by way of lead 31*b* to the input of arithmetic unit 60. The unit 60 operates on the information flowing from the differing registers and the resultant signals are applied back to the registers by way of an OR gate 40 and enabled AND gate 71.

As previously described the switches 50*a*–50*j* are effective by way of matrix 51 to produce differing first instructions in the F register 25. Each of the first instructions have a different address but have the same first part, viz. 00011, which corresponds to a command for the computer to make a jump with a link. Referring now to FIG. 2 there is shown matrix 51 in detail. In order to produce the instruction first part, 00011, there is provided an output terminal 61 which has a connection to a switching input of the fourth and fifth flip-flop circuits of the F register 25. Accordingly, when any one of the switches 50*a*–50*j* is actuated the fourth and fifth flip-flops are switched to a "1" state by a negative going signal applied thereto while the first, second and third flip-flops remain in their "0" state by the maintenance of a zero signal thereto. It will be understood that a negative going potential corresponds to a "1" bit, while a zero or ground potential corresponds to a "0" bit. Thus the first five flip-flops produce the required 00011.

The foregoing is achieved in the matrix 51 in the following manner. When none of the switches 50*a*–50*j* are actuated it will be seen that a diode 62 is rendered conductive as a result of current flow by way of the positive side of battery 63, resistor 64, diode 62 to ground. An additional current may be traced by way of the positive side of battery 65, resistor 66, diode 62 and to ground. Since output terminal 61 is connected to the anode of diode 62, a ground potential is produced at that terminal which corresponds to a "0" bit. However, when any one of the switches 50*a*–50*j* is actuated, as for example 50*a*, a circuit may be traced by way of the positive side of battery 63, resistor 64, conductor 68, a diode 69, switch 50*a* and to the negative side of battery 71. As a result diode 62 is rendered nonconductive and a negative potential is produced at terminal 61 which corresponds to a "1" bit. Thus a negative potential is applied to switch the fourth and fifth flip-flops of F register to their "1" states to produce the required 00011 for a jump with link command.

In order to produce the correct address for each of the switches 50*a*–50*j* there is further provided four conductor columns 75*a*, 75*b*, 75*c* and 75*d*, which are connected respectively to output terminals 76, 77, 78 and 79. Each of the output terminals 76–79 is connected by way of resistors 80–83 respectively to the positive sides of batteries 84–87 respectively. When none of the switches 50*a*–50*j* are actuated it will be understood that a circuit may be traced from each of the batteries 84–87 through resistors 80–83 respectively and through diodes 80*a*–80*d* respectively. In this manner a zero or ground potential is produced at each of the output terminals 76–79 corresponding to a "0" bit.

If for example switch 50*a* is actuated a current flow may be traced by way of battery 85, resistor 81, column conductor 75*b*, a diode 90, switch 50*a* to the negative side of battery 71. In this way a negative potential is produced at output terminal 77. In similar manner a circuit may be traced by way of the positive side of battery 86, resistor 82, column conductor 75*c*, diode 90*a*, switch 50*a* to the negative side of battery 71. Thus a negative potential corresponding to a "1" bit is produced at output terminal 78. Output terminals 76 and 79 remain unchanged from their "0" state.

In this manner the output terminals 79–76 produce outputs corresponding to 0110 and are applied respectively to the 14–17 flip-flops of F register 25 and these flip-flops are respectively set to their 0110 states. The 6–13 flip-flops of register 25 have no switching connection to matrix 51. Therefore upon actuation of switch 50*a* the flip-flops 6–17 produce the signal 0000 0000 0110 which is the address corresponding to switch 50*a*.

With the above in mind, it will now be obvious that the actuation of each of the remaining switches 50*b*–50*j* produces in the F register 25 an instruction having a corresponding address. For example, if switch 50*b* is actuated, current flow may be traced by way of column conductors 75*a*–75*c* and through diodes 91*a*–91*c*, respectively, to switch 50 and the negative side of a battery 93. As a result negative potentials are produced at output terminals 76, 77 and 78 and ground potential at terminal 79 which correspond to 0111. Thus when switch 50*b* is actuated the F register is set at 00011 0000 0000 0111 which includes the jump with link instruction and the address in memory corresponding to switch 50*b*.

In like manner the remaining switches upon actuation produce the following instructions in F register 25:

50*c*—00011 0000 0000 1000
50*d*—00011 0000 0000 1001
50*e*—00011 0000 0000 1010
50*f*—00011 0000 0000 1011
50*g*—00011 0000 0000 1100
50*h*—00011 0000 0000 1101
50*i*—00011 0000 0000 1110
50*j*—00011 0000 0000 1111

The principles of the invention having now been explained together with modifications thereof it is to be understood that many more modifications may be made all within the spirit and scope of the following claims. For example, the main memory 11 may include magnetic drum memory circuits rather than delay lines 12–12*g*. Such magnetic drum memory circuits are shown in "Understanding Digital Computers" by Paul Siegel, John Wiley & Sons, Inc., 1961, at page 269 et. seq.

What is claimed is:

1. In a digital computer having a memory in which there is stored a library of routines, a system for selecting a desired routine from said library comprising
   at least one register,
   a matrix adapted to generate selected pluralities of signals representing a first instruction,
   a plurality of operable selection switches each having a connection to said matrix for operation thereof,
   means connecting said matrix to said register for producing in said register a first instruction corresponding to the actuation of one of said switches, and
   means responsive to each of said first instructions to access the address specified by said first instruction in memory, whereby at that memory address a second instruction has been placed instructing the computer to begin a program routine.

2. The digital computer of claim 1 in which said matrix includes a row conductor for each switch and a column conductor for each of the bits in said address of said first instruction, and
   means including diodes connecting said row conductors and said column conductors for producing the same command and a different distinct address upon actuation of each of said switches whereby each of said switches may directly select a different routine from said library.

3. The digital computer of claim 1 in which said memory includes a plurality of serial memory circuits each having an associated delay line, means for recirculating information in each of said memory circuits and through its associated delay line, and in which said responsive means includes control means connected to said register for operating in response to said instructions to select one of said memory circuits and to read out the information at the address of that instruction.

4. In a digital computer including a serial memory having stored therein a library of routines, a system for conveniently selecting desired ones of said routines comprising, a first and a second register, a diode matrix, a plurality of operable selection switches each having a connection to said matrix for operation thereof, means connecting said matrix to said first register for producing in said first register a distinct first instruction corresponding to the actuation of one of said switches, means for injecting each of said first instructions from said first register into said second register, and means responsive to each of said first instructions in said second register to access the address specified by said first instruction in memory, whereby at that memory address a second instruction has been placed instructing the computer to begin a program routine.

5. The digital computer of claim 4 in which said serial memory comprises a plurality of memory circuits and including means for reading out desired information from a selected memory circuit and in which said matrix comprises a different row conductor for each of said switches, and means including diodes connected to said row conductors for producing a different first instruction upon actuation of each of said switches with each of said first instructions including the same command to be performed by the computer but having different addresses.

6. The digital computer of claim 4 in which said matrix includes a row conductor for each switch and a column conductor for each bit in said address of said first instruction, and means including diodes connecting said row conductors and said column conductors for producing a different address upon actuation of each of said switches.

7. The digital computer of claim 4 in which said serial memory comprises a plurality of recirculating serial memory circuits each having a delay line, and in which said responsive means comprises a control register for selecting one of said memory circuits and controlling the selected memory circuit to access said address.

8. The digital computer of claim 4 in which said matrix includes a row conductor for each of said switches, a column conductor for each of the bits in said address of said first instruction, addressing means including diodes connecting said row conductors and said column conductors for producing in said second register a different distinct address associated with each of said switches, and instruction circuit means including diodes having connections to said column conductors for producing in said first register a predetermined jump command upon actuation of any of said switches.

9. In a digital computer having a memory section including a library of subroutines, a system for selecting desired subroutines comprising, a first and a second register, a plurality of selection switches each connected to a diode matrix, means connecting said matrix to said first register for producing in said first register one of a set of first instructions a different one for each switch, and means for injecting said first instructions from said first register into said second register which commands said computer to access a first address in memory, whereby at that memory location a second instruction has been placed instructing the computer to begin a program subroutine.

10. The digital computer of claim 9 in which said memory section includes a plurality of serial memory circuits each having an associated delay line, means for recirculating information in each of said memory circuits and through its associated delay line, and in which there is provided control means connected to said second register for operating in response to said instructions to select one of said memory circuits and to readout the information at the address of that instruction.

11. The digit computer of claim 9 in which said memory section comprises a plurality of recirculating serial memory circuits, means including a control circuit responsive to said instructions in said second register for accessing said memory by selecting one of said memory circuits and reading out desired information from said selected memory circuit, and in which said matrix comprises a different row conductor for each of said switches, and means including diodes connected to said row conductors for producing a different first instruction upon actuation of each of said switches with each of said first instructions including the same command to be performed by the computer but having different addresses.

12. The digital computer of claim 9 in which said matrix includes a row conductor for each of said switches, a column conductor for each of the bits in said address of said first instruction, addressing means including diodes connecting said row conductors and said column conductors for producing in said second register a different distinct address corresponding to each of said switches, and instruction circuit means including diodes having connections to said column conductors for producing in said first register a predetermined jump with link command upon actuation of any of said switches.

13. In a digital computer including a serial memory in which there is stored a library of subroutines, a system for selecting a desired subroutine from said library comprising a first register, a memory circuit including an instruction register, a diode matrix having row conductors and column conductors, a plurality of operable selection switches each having a connection to an associated row conductor, means connecting said column conductors of said matrix to said first register for producing in said first register a different distinct first instruction corresponding to the actuation of a selected one of said switches, means connected to said memory circuit for injecting each of said first instructions from said first register into said instruction register, and control means connected to said memory circuit for accessing the address of said first instruction in memory whereby at that memory address a second instruction has been placed instructing the computer to begin a program subroutine.

14. In a digital computer including a plurality of recirculating serial memory circuits having stored therein a library of subroutines, a switching system for directly selecting a desired subroutine from said library comprising an F register, an additional recirculating serial memory circuit including an instruction register, a matrix including a plurality of row conductors and column conductors, means including diodes connecting differing ones of said row conductors and said column conductors, a plurality of operable selection switches each having a connection to an associated row conductor, means connecting said column conductors to said F register for producing in said first register a first instruction upon actuation of each of said switches, each of said first instructions comprising identical commands and a different distinct address associated with a respective switch, means connected to said additional memory circuit for injecting each of said first instructions from said F register into said instruction register, and means including control register means connected to each of said memory circuits for accessing the address of said first instruction in memory whereby at that memory address a second instruction has been placed instructing the computer to begin one of said program subroutines.

References Cited

UNITED STATES PATENTS 3,187,321 6/1965 Kameny ............ 340—345

ROBERT C. BAILEY, *Primary Examiner.*

R. ZACHE, *Assistant Examiner.*